No. 818,208. PATENTED APR. 17, 1906.
F. L. O. WADSWORTH.
PRISM GLASS.
APPLICATION FILED JUNE 17, 1905.

WITNESSES
Warren W. Swartz
R. A. Balderson

INVENTOR
F. L. O. Wadsworth
by Bakewell & Byrnes
his attorneys

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

PRISM-GLASS.

No. 818,208. Specification of Letters Patent. Patented April 17, 1906.

Application filed June 17, 1905. Serial No. 265,808.

*To all whom it may concern:*

Be it known that I, FRANK L. O. WADSWORTH, of Morgantown, Monongalia county, West Virginia, have invented a new and useful Prism-Glass, of which the following is a full, clear, and exact description, reference being had to the accompanying drawings, forming part of this specification, in which—

Figure 1:
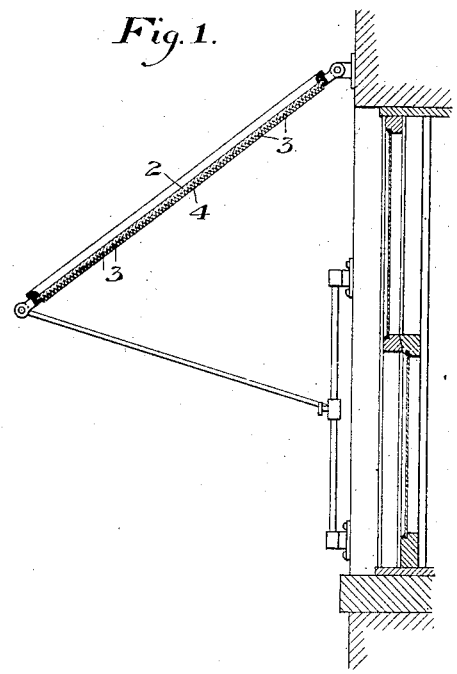
Figure 2:
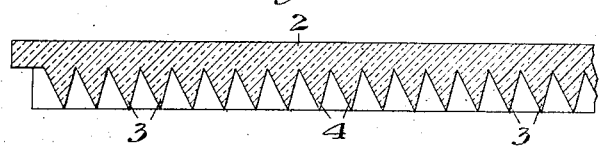
Figure 3:
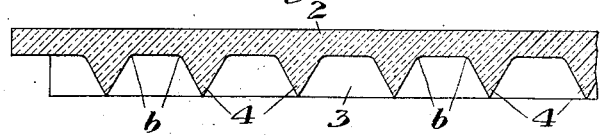

Figure 1 shows a prism-glass sheet set in a pivoted or movable canopy-frame and embodying my invention. Fig. 2 is a vertical section of the sheet in a plane parallel with the rib, and Fig. 3 is a vertical section in a plane at right angles to the sectional plane of Fig. 2.

In the manufacture of plates of prism-glass in which the prisms are formed by parallel ribs difficulty has been experienced from the fact that in a direction at right angles to the ribs the plate has only the strength of the main body of the glass, and when the plates are large this difficulty becomes serious, requiring them to be made of extra thickness in order to meet the rules of the insurance companies.

I have discovered that the sheets may be strengthened and rendered more capable of resisting breaking strains no matter in what direction it may be applied by providing them on the prism-surface with ribs which are preferably prismatic in general outline and preferably also of the same height as the prisms themselves, so that their apices will be flush therewith. These ribs are transverse to the lines of the prisms, preferably at right angles thereto, and their effect is to strengthen the glass sheet, so that in every direction it will have substantially the same strength as if it possessed throughout the full thickness of the body portion plus the height of the prisms. Therefore in order to obtain a plate of given strength the body of the glass plate 2 can be made much thinner than heretofore, and as a consequence the plate will be lighter and can be set in a lighter supporting-frame. The reduction of weight of the glass is of great practical importance where it is to be used in movable skylights and canopies, where light weight renders the structures less cumbersome and easy to handle and safer to use because of the lessened liability to break loose from their supports.

In the drawings, Fig. 1 represents a plate of prism-glass set in the frame of a pivoted canopy. 2 is the body of the glass plate, 3 3 are the parallel prism projections, and 4 4 are the strengthening-ribs. These latter are preferably made triangular in cross-section, and to render the plate easier to clean they are preferably curved or filleted at their bases, as at *b*. Their apices are preferably flush with the apices of the prism projections, and when made of prismatic form they constitute to a certain extent a second series of prisms, so that the glass plate will refract the light not only in a vertical direction like an ordinary prism-glass plate, but also in a lateral direction. This is important and desirable on account of the broad range of illumination which it affords.

Prism-plates made in accordance with my invention present a beautiful appearance, as the cross-ribs break up the monotony of the continuous prisms and impart a brilliant cut-glass effect.

My invention also prevents the well-known optical illusion which is present with prism-glass having continuous prisms of any considerable length and by which the prisms appear to be non-parallel and irregular. The transverse strengthening-ribs by breaking up the prisms into relatively short lengths prevents such illusion.

My prism-glass plates are preferably made by rolling a mass of glass into sheet form and while it is still plastic bringing a die thereon and pressing in one operation the prism projections and the transverse strengthening-ribs. This method of manufacture is described fully in a prior patent, No. 661,025, granted to D. C. Ripley and myself on October 30, 1900, for improvement in the manufacture of prism-glass.

The form of the projections and their arrangement will be modified in many ways within the scope of my invention as broadly claimed, since

What I claim is—

1. As a new article of manufacture, a prism-glass plate having a continuous prism-surface and having on the prism-face transverse strengthening-ribs.

2. As a new article of manufacture, a prism-glass plate having a continuous prism-surface and having on the prism-face transverse strengthening-ribs at right angles to the prism projections.

3. As a new article of manufacture, a prism-glass plate having a continuous prism-surface and having on the prism-face transverse strengthening-ribs, the apices of which are substantially flush with the apices of the prisms.

4. As a new article of manufacture, a prism-glass plate having a continuous prism-surface and having on the prism-face transverse strengthening-ribs angular in cross-section and filleted at the base.

5. As a new article of manufacture, a prism-glass plate having a continuous prism-surface and having on the prism-face transverse strengthening-ribs prismatic in cross-section and adapted to refract the light transversely.

In testimony whereof I have hereunto set my hand.

FRANK L. O. WADSWORTH.

Witnesses:
THOMAS W. BAKEWELL,
H. M. CORWIN.